UNITED STATES PATENT OFFICE.

CHARLES S. PALMER, OF NEWTONVILLE, MASSACHUSETTS.

METHOD OF REGENERATING STORAGE BATTERIES.

1,147,261.

Specification of Letters Patent. Patented July 20, 1915.

No Drawing. Application filed January 12, 1915. Serial No. 1,770.

*To all whom it may concern:*

Be it known that I, CHARLES S. PALMER, a citizen of the United States, residing in Newtonville, county of Middlesex and State of Massachusetts, have invented certain new and useful Improvements in Methods of Regenerating Storage Batteries, of which the following is a specification.

My invention relates to an improvement in the method of regenerating lead storage batteries, by which, old and sulfated lead storage batteries, whose capacity has been greatly reduced, due to the sulfation of the active masses, may be restored so as to have again a good capacity and usefulness.

I have discovered that, by immersing the damaged plates in a strong solution of acid-sodium-sulfate, $NaHSO_4$, or acid-sulfate of other alkaline metal, and then charging and discharging a few times under suitable conditions, the regeneration is rapid and efficient, thereby bringing the batteries back to a high degree of usefulness.

I am aware that minute quantities of various alkaline salts have been added to the ordinary electrolyte, in the vain hope of accelerating the remedial effect of the usual slow and often repeated charges applied in trying to restore a sulfated battery; but such minute additions are ineffective, and not within the spirit and scope of my work.

In using my regenerative method, I first clean the plates, removing the old electrolyte, and, after proper assembling of the battery parts, I add a concentrated solution of acid-sodium-sulfate, with the addition of a small amount of sulfuric acid sufficient to prevent efflorescence. I then charge and discharge several times, with due regard to keeping the negative and positive plates well balanced in the solvent and reducing action of my electrolyte in the alternate charge and discharge. During the charge the negative plate is chiefly affected, and, unless the subsequent discharge is suitably regulated, the two plates will not share equally in the regenerative action. I preferably use in the first cycle low current density about seven thousandths of an ampere per square in. of positive plate area, both in charge and discharge, increasing the current density with successive cycles, from say five to seven thousandths of an ampere per sq. in. of positive plate area in the first cycle, to several times, preferably three times the preceding in each successive cycle, till the plates are soon brought up to good efficiency. Usually three cycles will bring the battery back to high efficiency, though a few more treatments may be necessary in obstinate cases.

When acid-sodium-sulfate, or the acid-sulfate of other alkali-metal is not at hand, a solution of it can be prepared for my electrolyte, by taking a concentrated solution of common sodium sulfate in water, with the requisite quantity of partly dilute sulfuric acid to form acid-sodium-sulfate, with a slight excess of acid to prevent efflorescence, and keeping the sp. gr. above 1.1 and preferably around 1.2. My electrolyte has the combined qualities of strong concentration of sodium, or other alkaline-metal, salts, acid reaction insuring insolubility of the lead material of the plates during open circuit, together with strong solvent and reducing-and-oxidizing action in alternate charge and discharge.

Having thus described my invention, what I claim, and desire to secure by Letters Patent is:—

1. The method of regenerating sulfated lead storage batteries, which consists in charging and discharging the same, with a concentrated water-solution of an acid sulfate of an alkali-metal as electrolyte.

2. The method of regenerating sulfated lead storage batteries, which consists in charging and discharging the same, with an electrolyte consisting of a concentrated water-solution of an acid sulfate of an alkali-metal, with the addition of a slight excess of sulfuric acid.

3. The method of regenerating sulfated lead storage batteries, which consists in charging and discharging the same, with an electrolyte consisting of a solution of an acid sulfate of an alkali-metal, with a slight excess of sulfuric acid, employing low current density in the first cycle, and successively increasing in later cycles.

4. The method of regenerating sulfated lead storage batteries, which consists in charging and discharging the same with a concentrated solution of an acid sulfate of an alkali-metal, with a small addition of sulfuric acid, the charge and discharging rates being kept at such ratio that the negative and positive plates shall share equally in the regenerative action.

5. The method of regenerating sulfated lead storage batteries, which consists in charging and discharging the same, with an electrolyte consisting of a concentrated solution of an acid sulfate of an alkali-metal, with the addition of a small amount of sulfuric acid, the specific gravity of such electrolyte being maintained above 1.1 and the successive charges and discharges being so regulated as to secure uniformity of regenerative action upon the negative and positive plates.

In witness whereof, I have hereunto set my hand at the city of Newton, county of Middlesex and State of Massachusetts, this 9th day of January, 1915.

CHARLES S. PALMER.

Witnesses:
WM. T. HALLIDAY,
H. W. DAVIS.